Nov. 19, 1935.  H. D. CHURCH  2,021,404
TRANSMISSION
Filed Jan. 8, 1930   10 Sheets-Sheet 1

INVENTOR
HAROLD D. CHURCH
BY
ATTORNEYS

Nov. 19, 1935.  H. D. CHURCH  2,021,404
TRANSMISSION
Filed Jan. 8, 1930    10 Sheets-Sheet 2

INVENTOR
HAROLD D. CHURCH
BY *Richey & Watts*
ATTORNEYS

Nov. 19, 1935.  H. D. CHURCH  2,021,404
TRANSMISSION
Filed Jan. 8, 1930   10 Sheets-Sheet 4

INVENTOR
HAROLD D. CHURCH
BY
Richey & Watts
ATTORNEYS

Nov. 19, 1935.　　H. D. CHURCH　　2,021,404
TRANSMISSION
Filed Jan. 8, 1930　　10 Sheets-Sheet 5

INVENTOR
HAROLD D. CHURCH
BY *Richey & Watts*
ATTORNEYS

Nov. 19, 1935.    H. D. CHURCH    2,021,404
TRANSMISSION
Filed Jan. 8, 1930    10 Sheets-Sheet 6
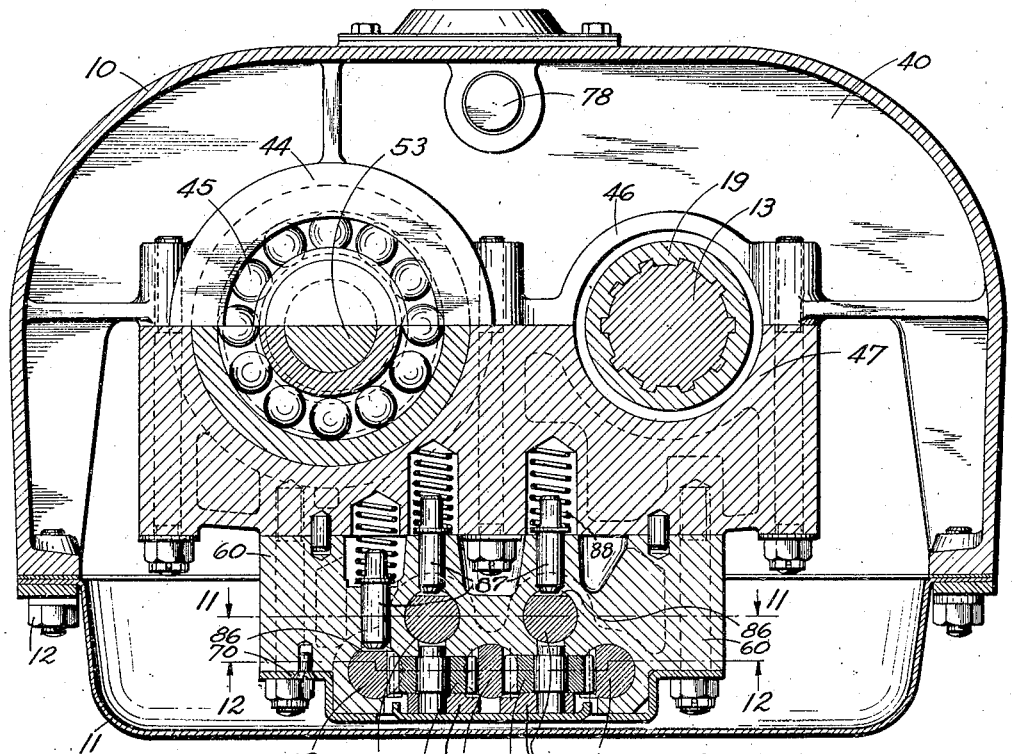
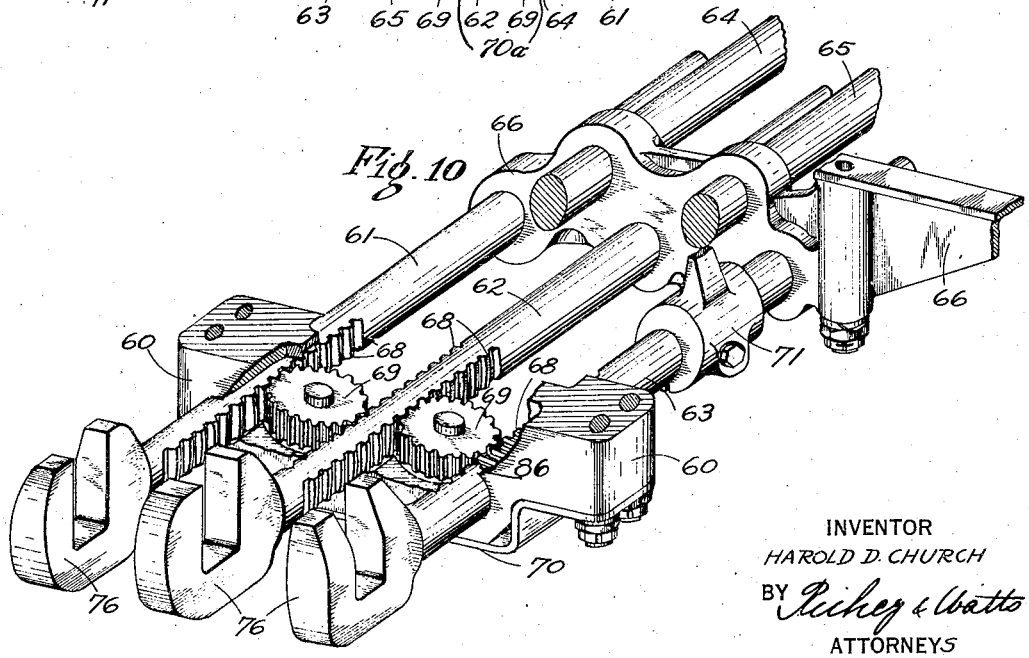
INVENTOR
HAROLD D. CHURCH
BY
ATTORNEYS Nov. 19, 1935.  H. D. CHURCH  2,021,404
TRANSMISSION
Filed Jan. 8, 1930  10 Sheets-Sheet 7
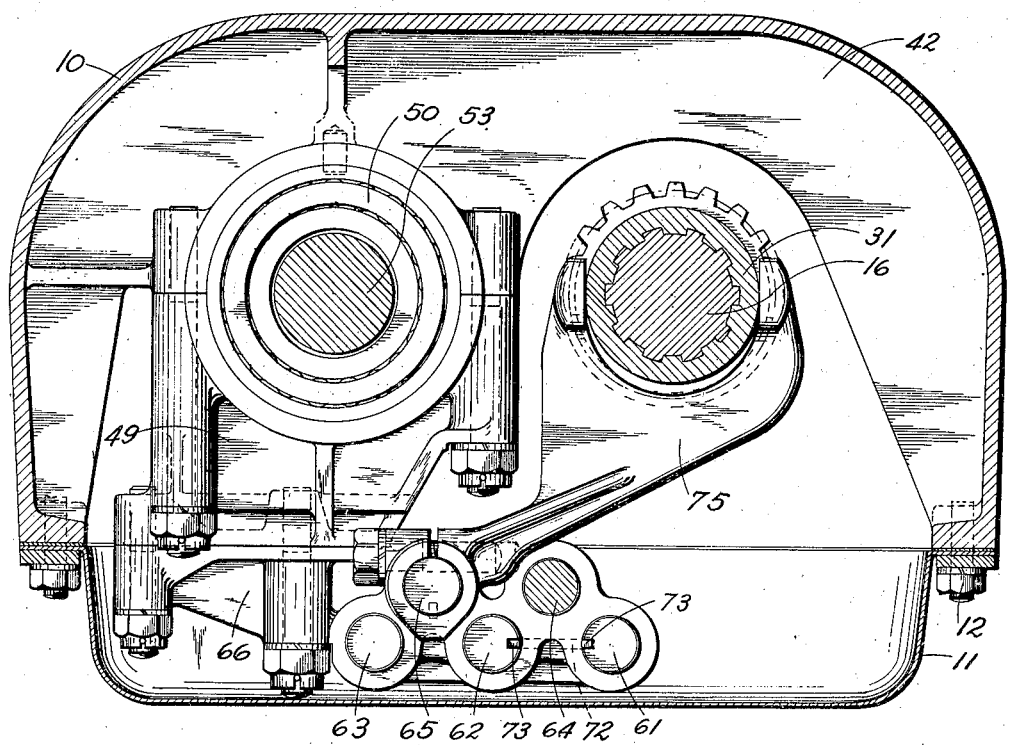
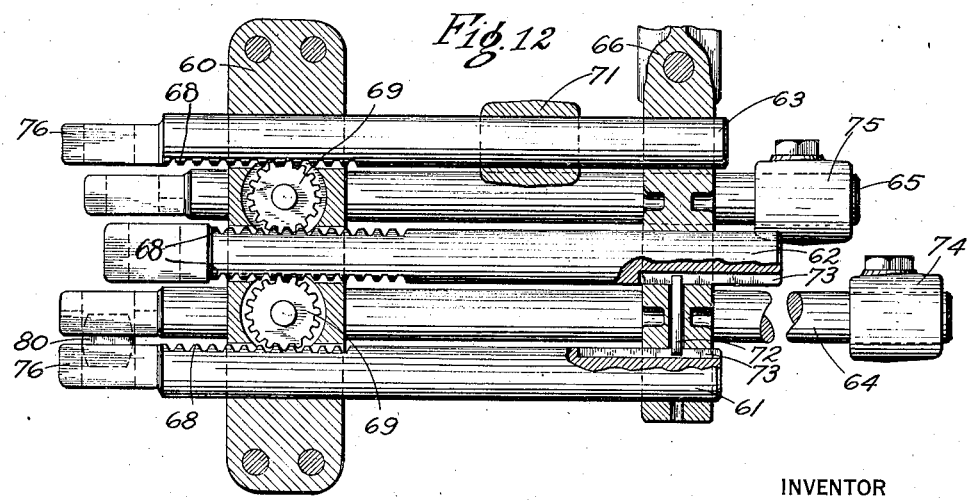
INVENTOR
HAROLD D. CHURCH
BY
ATTORNEYS INVENTOR
HAROLD D. CHURCH
BY *Richey & Watts*
ATTORNEYS Nov. 19, 1935.   H. D. CHURCH   2,021,404
TRANSMISSION
Filed Jan. 8, 1930    10 Sheets-Sheet 9
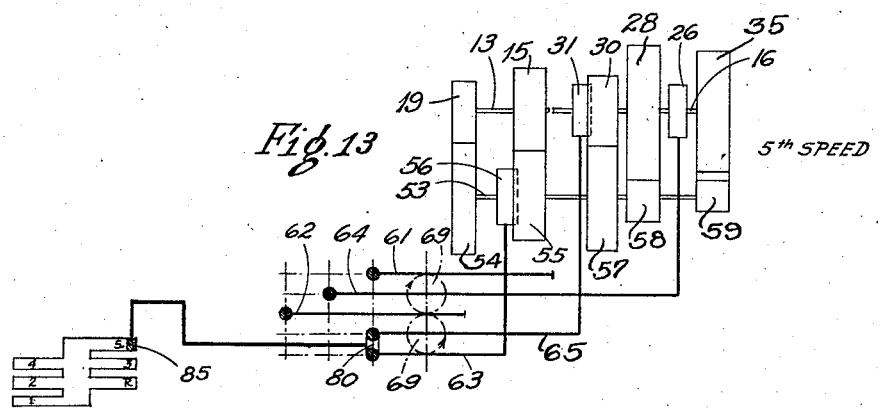
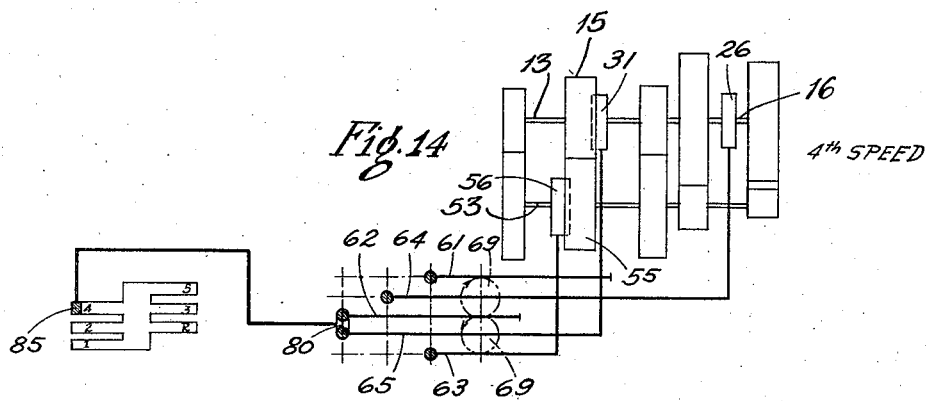
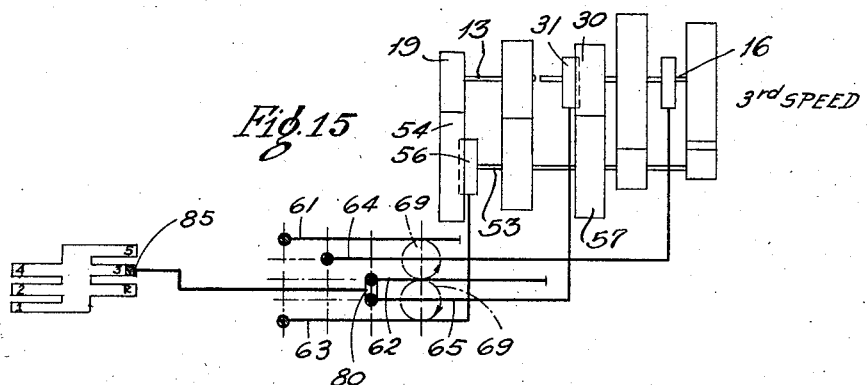
INVENTOR
HAROLD D. CHURCH
BY Richey & Watts
ATTORNEYS

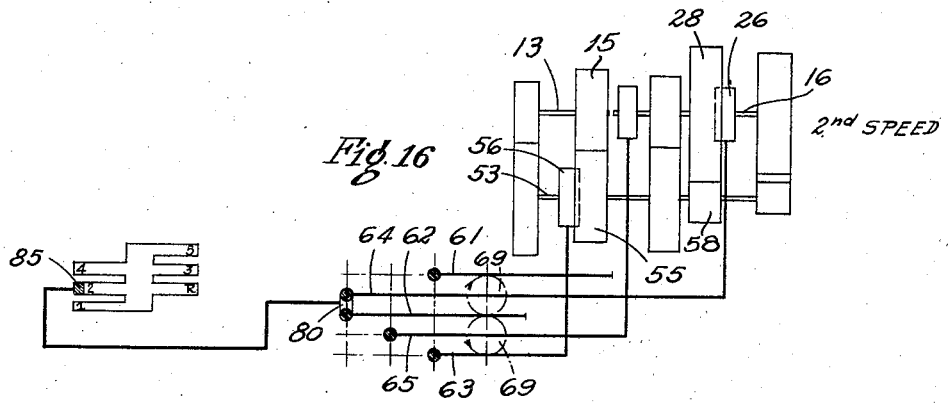
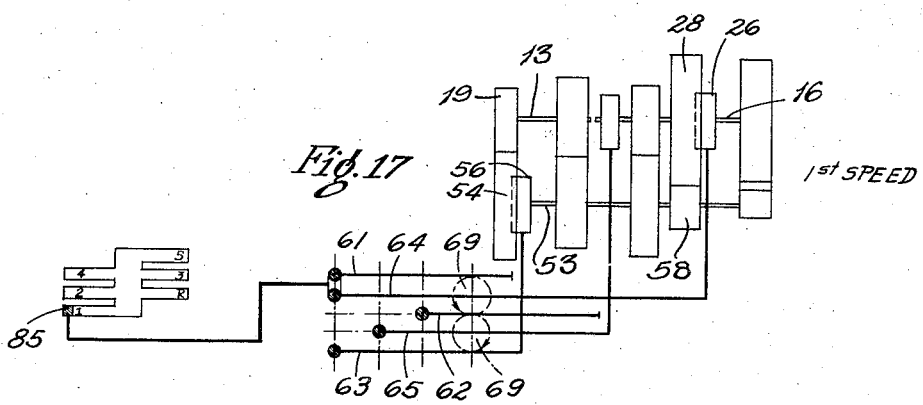
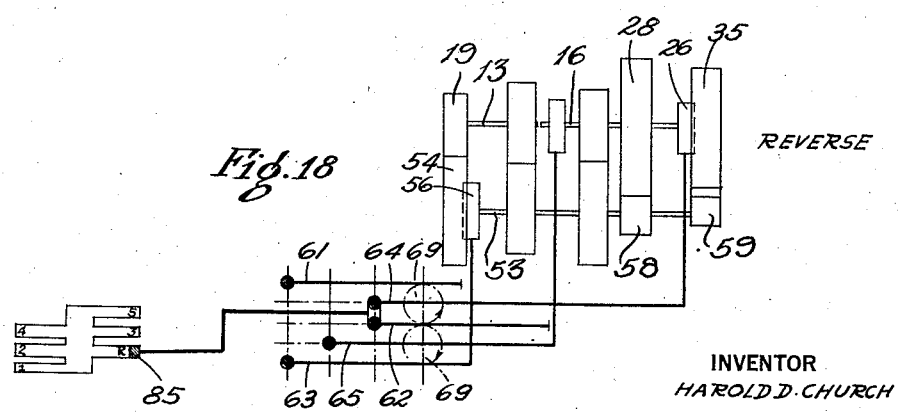

Patented Nov. 19, 1935

2,021,404

UNITED STATES PATENT OFFICE

2,021,404

TRANSMISSION

Harold D. Church, Cleveland Heights, Ohio, assignor to The White Motor Company, Cleveland, Ohio, a corporation of Ohio Application January 8, 1930, Serial No. 419,438

5 Claims. (Cl. 74—359)

This invention relates to transmissions for automotive vehicles, and more particularly to heavy duty, five speed transmissions for busses and trucks.

One object of this invention is to provide a transmission in which all the gears are in constant mesh, shifting being effected by selectively engaging certain of the gears with slidable clutches.

Another object of the invention is to arrange the parts of a transmission of this character in such a manner as to economize on space and material.

Another object is to arrange the countershaft in a transmission of this type in such a manner that the same may be selectively driven at different speeds, whereby each gear between the countershaft and the driven shaft may be used to attain a plurality of different speeds.

Another object is to provide an improved shifting mechanism for transmission of this type.

Other objects relating to details of construction and economies of manufacture will become apparent upon a more complete examination of this specification.

In the accompanying drawings, which illustrate one embodiment of this invention, Figure 1 is a plan view of a transmission with the upper part of the casing removed and showing certain of the bearings in section;

Figure 6 is a section taken on the line 6—6 of Figure 3;

Figure 7 is a section taken on the line 7—7 of Figure 3;

Figure 10 is a perspective view of a portion of the shifting rod assembly;

Figure 12 is a detailed view of the shifting rods taken on the line 12—12 of Figure 6;

Figure 1:
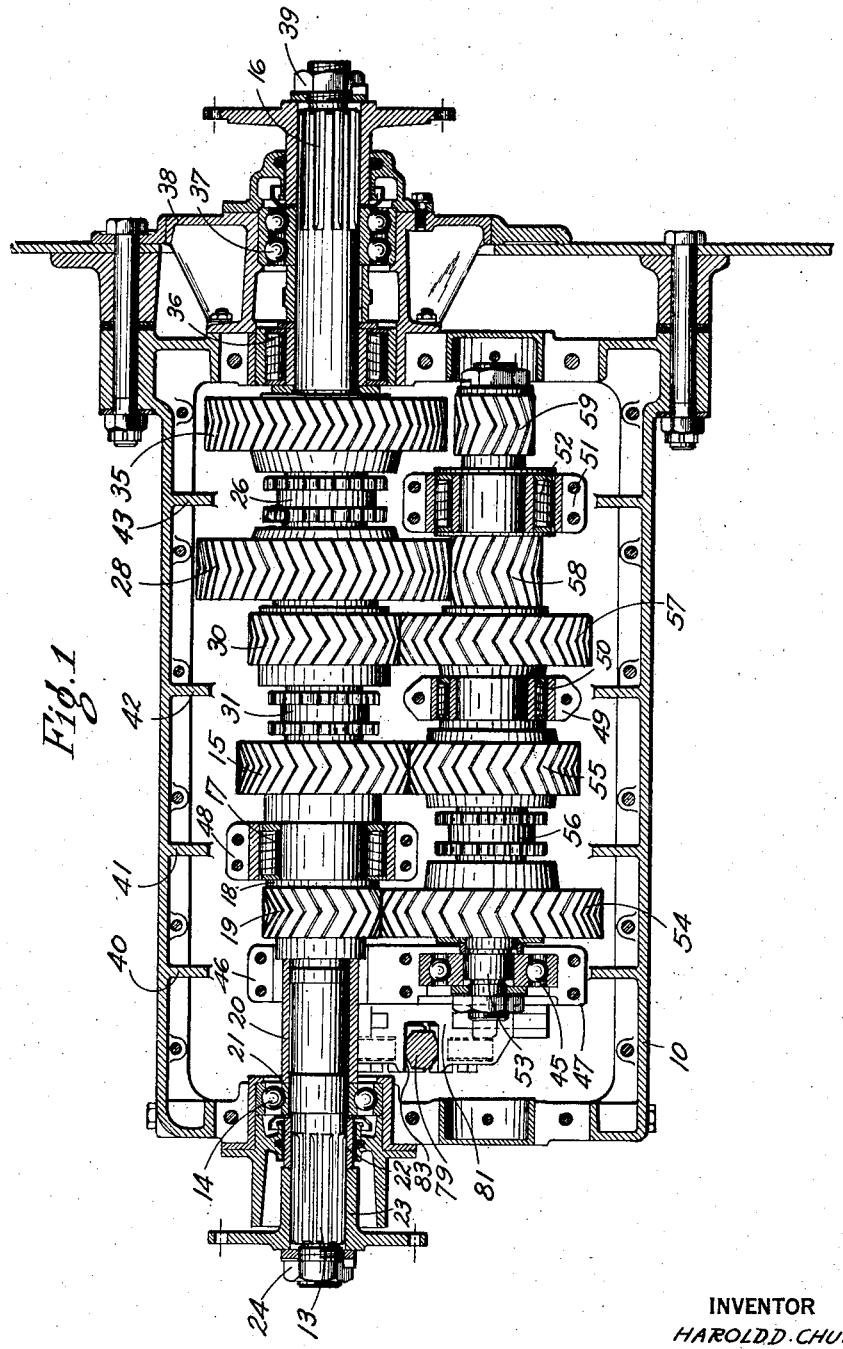
Figure 2:
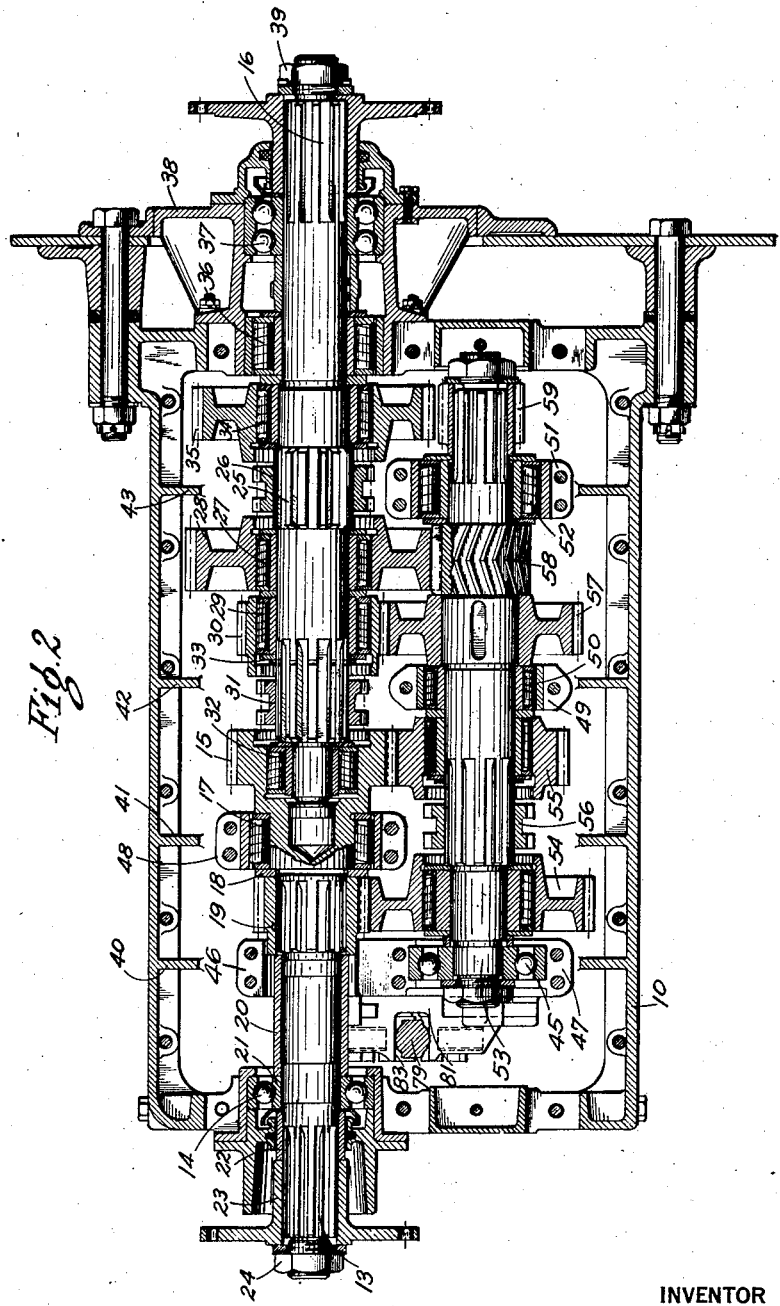
Figure 2 is a view similar to Figure 1, but showing a greater number of parts in section.

Figures 13 to 18, inclusive, are diagrammatic showings of the arrangement of the mechanism at various speeds.

Referring to the drawings, the transmission disclosed therein comprises a casing 10 which supports the various internal elements of the transmission. The bottom of the casing is closed by means of a sheet metal oil pan 11, which is bolted thereto as indicated at 12. A driving shaft 13 projects through the front wall of the casing 10 and is supported therefrom by means of bearings 14. The inner end of the driving shaft 13 is formed with an integral gear 15, which is axially bored to provide a bearing for the end of a driven shaft 16. Extending outwardly from the gear 15, the shaft 13 is provided with portions of successively reduced diameters to receive a roller bearing 17, a thrust washer 18, a splined gear 19, a spacing sleeve 20 and a bearing race 21, a spacing sleeve 22 and a flanged driving element 23, and a nut 24. All of these elements are disposed in abutting relation and are rigidly secured in position by means of the nut 24.

The driven shaft 16 is provided with portions of successively reduced diameters extending in both directions from a splined portion 25, which slidably supports a clutch 26. Extending towards the forward end from the splines 25, the shaft 16 receives a roller bearing 27 for a gear 28, a bearing 29 and a gear 30, a splined clutch 31, and a bearing 32. The bearings 27 and 29 are spaced apart by means of a washer and are held against movement in one direction by the end of the splines 25 and against movement in the opposite direction by means of a resilient locking washer 33, which snaps into a groove formed in the splines which support the clutch 31. Towards the rear end from the splines 25, the shaft 16 receives successively a bearing 34 for a gear 35, a roller bearing 36, and a combined radial and thrust bearing 37. The latter two bearings serve to support the driven shaft 16 in an extension housing 38 secured to the end wall of the casing 10. The elements at the rear end of the shaft 16 including the parts enumerated in the preceding and a spacer member and other parts not mentioned are retained in position by means of a nut 39 in the same way in which the elements are retained on the driving shaft 13 by the nut 24.

The casing 10 is provided with downwardly extending integral webs 40, 41, 42 and 43. The web 40 is provided with a semi-circular recessed portion 44 designed to receive a bearing 45 for the countershaft of the transmission, and with a similar portion 46 which extends over and is spaced from the driving shaft 13. A bracket 47 having complemental recesses is bolted to the web 40 and serves as a support for the shifting rods as will be explained hereinafter. The web 41 serves as a support for the driving shaft bearing 17, the lower half of the bearing support being formed by a cap 48, which is bolted to the web 41. The web 42 has a cap 49 bolted thereto, forming a support for a countershaft bearing 50. A cap 51 bolted to the web 43 supports a countershaft bearing 52.

The countershaft 53 of the transmission is supported in the bearings 45, 50 and 52 and supports gears cooperating with the gears on the driving and driven shafts. Two gears 54 and 55 mounted on bearings on the countershaft mesh respectively with the gears 19 and 15 on the driving shaft. A slidable clutch 56 splined on the countershaft intermediate the gears 54 and 55 is arranged to engage either of such gears to separately connect them with the countershaft for rotation therewith. Two gears 57 and 58 keyed to the countershaft mesh respectively with the gears 30 and 28, which are freely rotatable on the driven shaft. A gear 59 splined to the countershaft meshes with a reverse idler gear 67, rotatably supported on a shaft mounted in the web 43 and the rear wall of the casing. The gear 67 meshes with the driven shaft gear 35.

All of the gears are preferably provided with herringbone teeth, as illustrated in order to obtain silent running without end thrust. As shown, the gears which are rotatably mounted mesh with gears which are fixed to a shaft, and the engagement therebetween retains the rotatable gears against end play on their bearings. It is to be understood however, that spiral or spur gears can be utilized if desired, through use of suitable means for resisting the end thrust impressed on the rotatably mounted gears.

It will be evident from the foregoing description that the countershaft can be driven at two different speeds from the driving shaft by means of the gears 54 and 55, and that the driven shaft can be coupled directly to the driving shaft, or can be driven by the countershaft at two different forward speeds and reverse speeds. Thus by properly manipulating the three clutches, it is possible to obtain five forward speeds and two reverse speeds.

Figure 5:
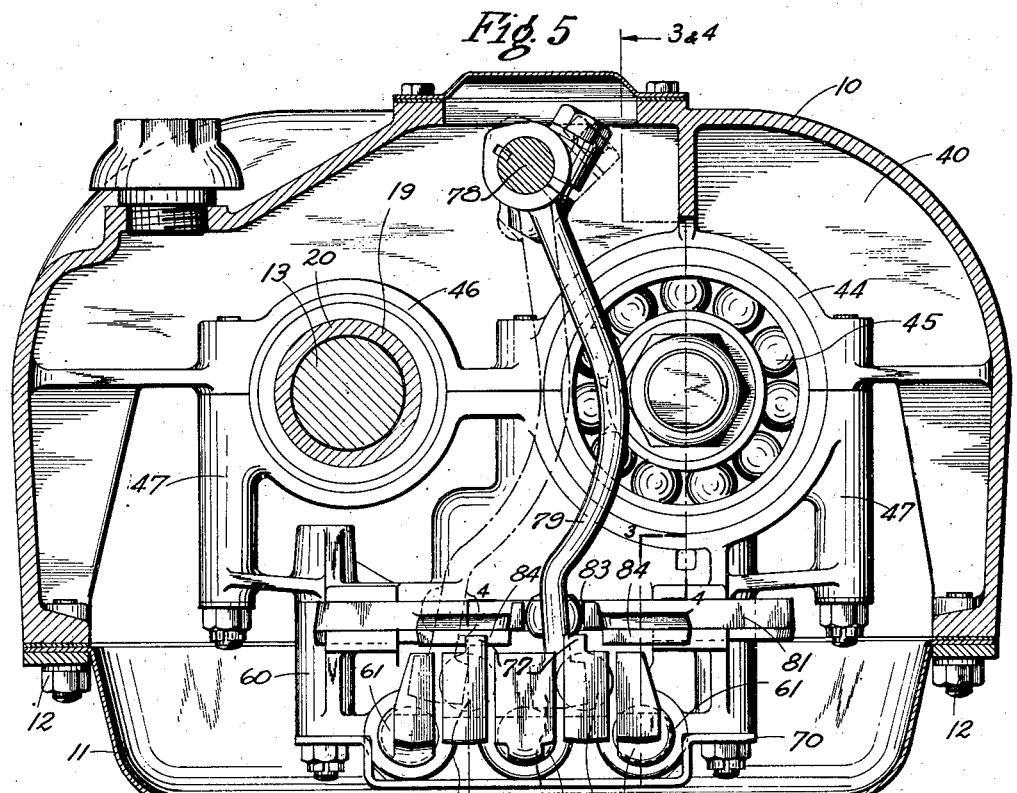
Figure 5 is a section taken on the line 5—5 of Figure 3.
Figure 9:
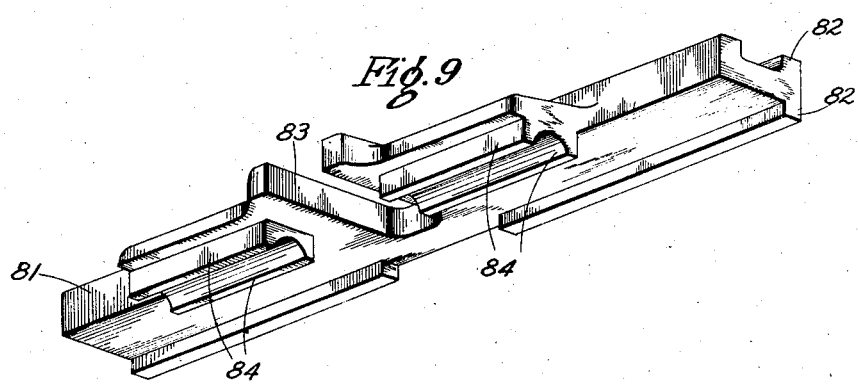
Figure 9 is a perspective view of a locking plate used in connection with the shifting rods.
Figure 8:
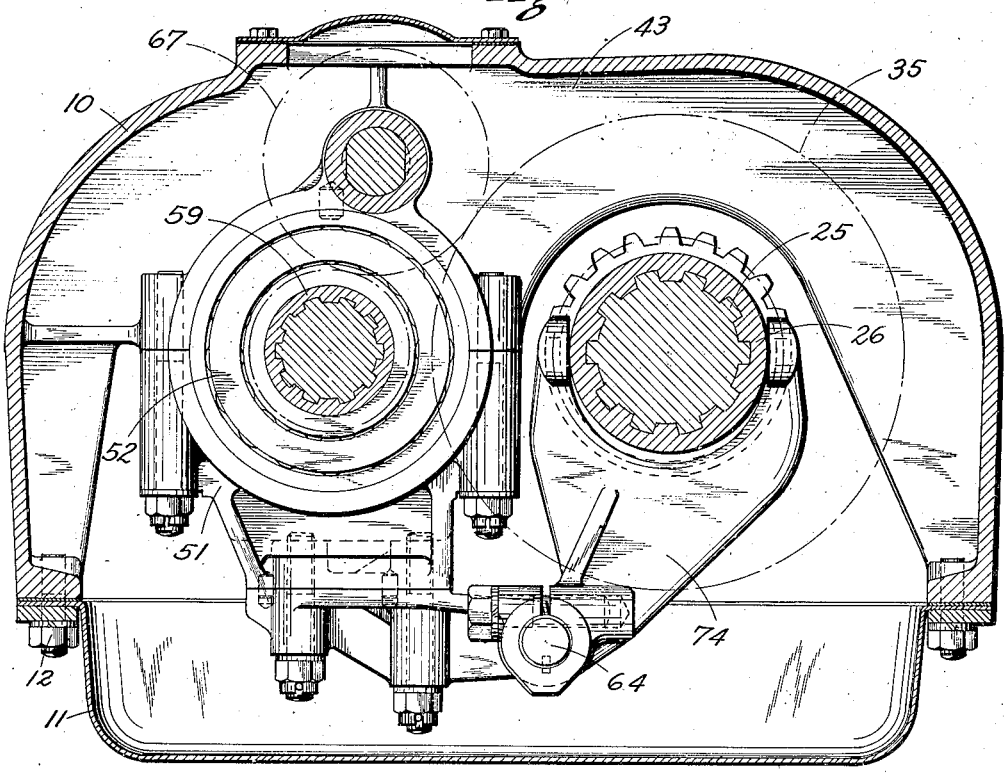
Figure 8 is a section taken on the line 8—8 of Figure 3.
Figure 11:
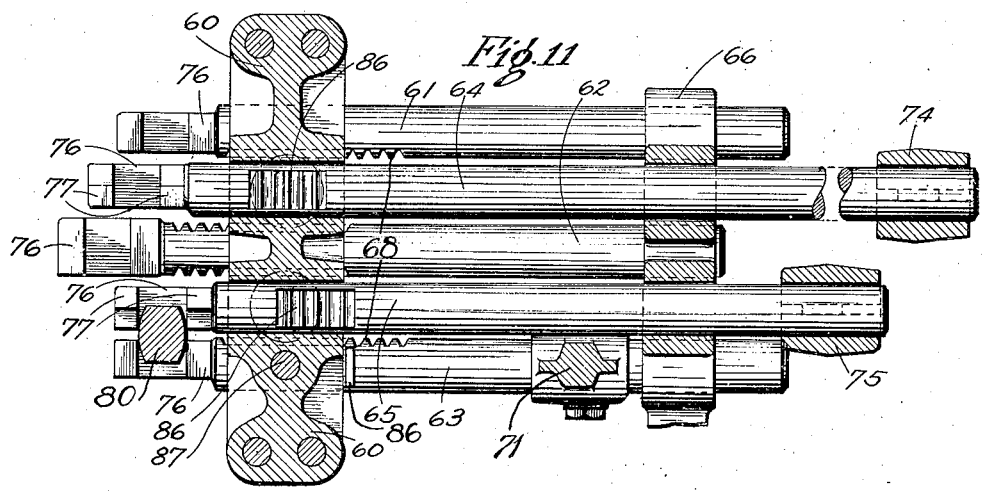
Figure 11 is a detailed sectional view taken on the line 11—11 of Figure 6.

The shifter rods for operating the three clutches are supported in the bottom of the casing by the webs 40, 42 and 43. As shown in Figure 5, a bracket 60 is bolted to the bracket 47 and is provided with a plurality of apertures for slidably receiving five shifter rods 61, 62, 63, 64 and 65. A bracket 66 bolted to the bearing cap 49, which is secured to the web 42, is provided with a similar series of apertures for supporting the shifter rods.

As shown in Figure 12 the rods 61, 62 and 63 are disposed in the same plane and have adjacent surfaces formed with rack teeth 68. Small spur gears 69 positioned between the rods disposed in recesses in the bracket 60 engage the rack teeth 68 so that the three rods are connected for simultaneous movement. The gears 69 are journalled on pins supported in the bracket 60 and members 70a located beneath the gears. The members 70a are retained in place by means of a strap 70 held in position by the bolts which fasten the bracket 60 to the bracket 47. A shifting fork 71 is secured to the rod 63 and engages the clutch 56 on the countershaft. The rods 61 and 62 do not have shifting forks, but serve merely as actuating means for the rod 63. In order to prevent the rods 61 and 62 from turning, a pin 72 is disposed in the bracket 66 and engages in slots 73 formed in the rods 61 and 62. The rod 63 is held against turning by the fork 71.

The rods 64 and 65 are disposed in a plane parallel to and spaced above the plane of the rods 61, 62 and 63. The rod 64 carries a shifting fork 74, which engages with the clutch 26 on the driven shaft, and the rod 65 carries a shifting fork 75 which engages with the clutch 31.

All of the shifter rods are provided at their forward ends with U-shaped heads 76, which are arranged to be in alignment when the transmission is put in neutral, and which are disposed substantially in the same plane. The heads on the rods 64 and 65 are provided on their opposite sides with upstanding lugs 77 for locking these rods against movement, as will be explained hereinafter.

Figure 3:
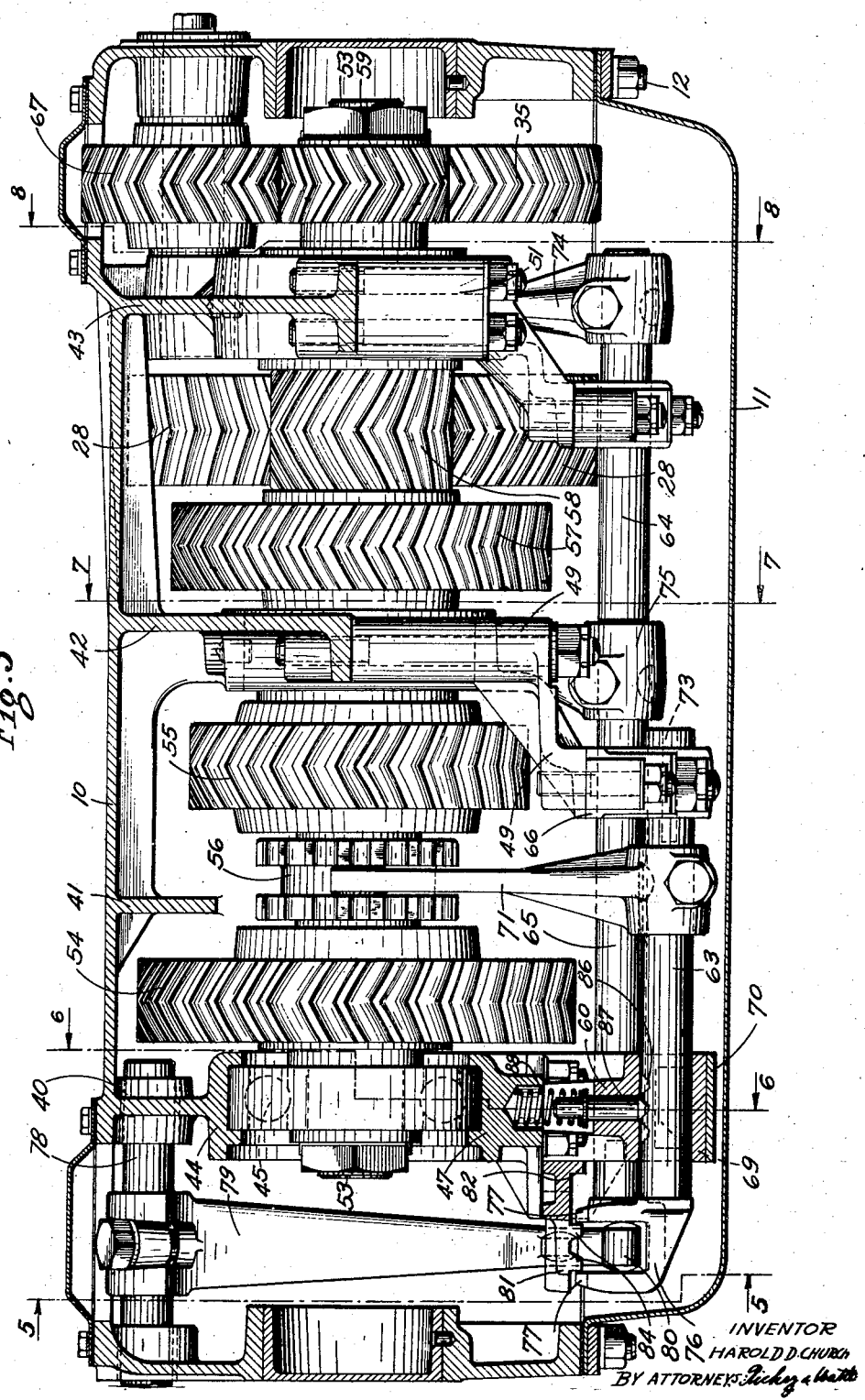
Figure 3 is a vertical section through the transmission taken substantially on the line 3—3 of Figure 5, the shafts, gears, and bearings being shown in full.
Figure 4:
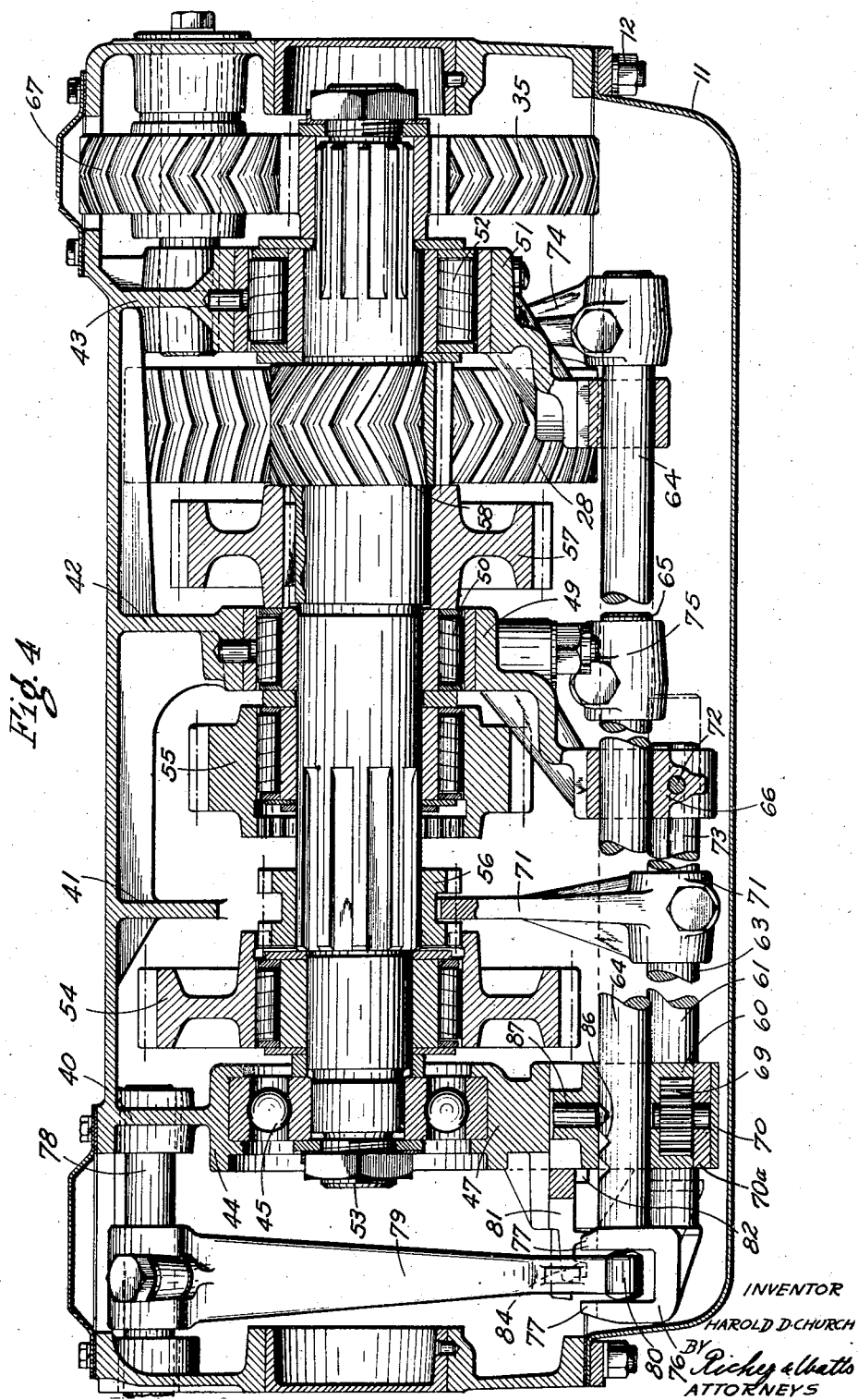
Figure 4 is a section on the line 4—4 of Figure 5, the elements being shown in first speed position.

A shaft 78 is slidably and rotatably journalled in the upper part of the front wall of the casing 10 and in the web 40 as shown in Figure 3. An arm 79 is secured to and depends from the shaft 78 and is provided at its lower end with a head 80 for selective engagement with any two of the U-shaped heads 76. A plate 81 is slidably secured between the brackets 60 and 47 by means of ribs 82 formed on the upper and lower surfaces thereof for engagement in complementary grooves formed in the respective brackets 60 and 47. The central portion of the plate 81 extends over the upper ends of the heads 76 on the shifting rods and is provided with a centrally disposed slot 83 to permit passage of the arm 79 therethrough. On opposite sides of the slot 83, the plate 81 is provided with parallel projecting ribs 84, which are arranged to slide between and engage the lugs 77 on the heads 76 carried by the rods 64 and 65 in certain positions.

The shaft 78 extends forwardly from the front wall of the casing 10 to a point subjacent the driver's compartment of a vehicle. A hand lever (not shown) is secured to the shaft 78 diametrically opposite the arm 79 and extends upwardly through the floor of the driver's compartment in the usual manner. Movement of the hand lever laterally causes rotation of the shaft 78 and lateral movement of the arm 79 in the opposite direction to that in which the hand lever moves. Pushing the hand lever forwardly or rearwardly causes sliding movement of the shaft 78 and a corresponding forward or rearward movement of the arm 79. It will be evident that lateral movement of the hand lever enables the operator to select a particular drive and forward or rearward movement thereof shifts the clutches to set the transmission in the selected drive.

Figures 13 to 18, inclusive, illustrate diagrammatically the operation of the transmission. In Figure 13 the transmission is shown in fifth speed. When the hand lever designated by the numeral 85 is moved to the position marked 5 to establish fifth speed drive, the head 80 of the arm 79 engages the U-shaped heads of the two rods 63 and 65 and moves the same rearwardly. Rearward movement of the rod 65 causes the clutch 31 to engage the gear 30, and rearward movement of the rod 63 causes the clutch 56 to engage the gear 55. The countershaft will accordingly be driven by the driving shaft and the driven shaft will be driven by the countershaft at a higher rate of speed than the driving shaft.

Figure 14 shows the transmission in fourth or direct speed. Movement of the hand lever 85 into its fourth speed position causes the head 80 to engage the rods 62 and 65 and move the same forwardly. The forward movement of the rod 65 causes the clutch 31 to engage the gear 15 on the driving shaft 13 and directly couple the driving and driven shafts. The movement of the rod 62 causes rotation of the gears 69 and rearward movement of the rod 63, which engages the clutch 56 with the gear 55. In this speed the countershaft is idling, since there is no connection between the countershaft and the driven shaft.

Figure 15 shows the transmission in the next lower or third speed. The rods 62 and 65 are moved rearwardly causing the clutch 31 to engage the gear 30 and rotating the gears 69 in such a manner as to move the rod 63 forwardly. This motion of the rod 63 causes the clutch 56 to engage the gear 54. It will be seen that in this speed the driven shaft is connected to the countershaft in the same manner as in fifth speed, but the countershaft is driven at a lower speed through the gear 54.

In Figure 16 the hand lever has been moved to second speed position causing the head 80 to engage the rods 62 and 64 and pull the same forwardly. Forward motion of the rod 64 causes the clutch 26 to engage the gear 28, and forward motion of the rod 62 rotates the gears 69 and causes the rod 63 to move rearwardly and engage the clutch 56 with the gear 55. In this speed, the countershaft is driven from the drive shaft through the gears 15 and 55 and the driven shaft from the countershaft through gears 58 and 28.

Figure 17 shows the hand lever moved into its first speed position, in which the rods 61 and 64 are moved forwardly. The forward motion of the rod 64 causes the clutch 26 to engage the gear 28, and the forward motion of the rod 61 rotates the gears 69 and causes the rod 63 to move forwardly and engage the clutch 56 with the gear 54. In this speed, the countershaft is driven from the drive shaft through the gears 19 and 54 and the driven shaft from the countershaft through gears 58 and 28.

Figure 18 illustrates the transmission arranged in reverse. In reaching such drive the head 80 engages the rods 62 and 64 and moves the same rearwardly. The rearward motion of the rod 64 engages the clutch 26 with the reverse gear 35, and the rearward motion of the rod 62 rotates the gears 69 and moves the rod 63 forwardly, causing the clutch 56 to engage the gear 54. In this speed, the countershaft is driven from the drive shaft through the gears 19 and 54 and the driven shaft from the countershaft through gears 59, 67 and 35.

It will be evident that the rods 61 and 63 move together at all times and in a direction opposite to the direction of motion of the rod 62. Since one of the rods 61, 62 or 63 is engaged by the head 80 at all times, there can be no motion of any of these three rods without a corresponding motion of the hand lever. The rods 64 and 65, however, are not engaged by the gears 69 and when the head 80 is engaged with one of these rods, the other is released. The ribs 84 on the plate 81 are arranged to slide between and engage the lugs 77 on the rods 64 and 65 to prevent accidental movement of these rods when they are not in engagement with the head 80. It will be evident that when the arm 79 is in its neutral position, both of the rods 64 and 65 are engaged by the ribs 84 and held against motion. When the arm 79 is moved toward one side of the rod assembly, the rod on that side is released by the rib 84, while the other rod remains locked. In this manner unintentional movement of either of the rods 64 or 65 is prevented.

The rod 63 is provided with a releasable latch designed to retain it in the various positions to which it is moved, and the rods 64 and 65 with similar latches which serves to restrain them in neutral positions until engaged by the ribs 84, and to hold them in the other positions to which they are moved. The latch for each of the rods 63, 64 and 65 comprises notches 86 formed in the upper surface of the rod and a latch pin 87 slidably mounted in a bore in the bracket 60 and pressed downward for engagement with the notches 86 by a spring 88.

While the foregoing description is necessarily of a detailed character in order that the invention may be fully set forth, it is to be understood that the specific terminology employed is not to be construed as being restrictive or confining, and that various modifications may be resorted to without departing from the scope and spirit of the invention as defined in the following claims:

What I claim is:

1. A transmission comprising a casing having an open bottom and a substantially closed top and depending webs spaced within the casing, shafts supported by said casing and said webs below the top thereof, shifter rods supported by said webs below said shafts, and means to close the bottom of the casing.

2. A transmission for automotive vehicles including a driving shaft, a driven shaft arranged in axial alignment with said driving shaft, a counter-shaft, gear means arranged to selectively drive said counter-shaft from said driving shaft at either one of two different speeds, means to selectively couple said driving and driven shafts for rotation at the same speeds and gear means arranged to selectively drive said driven shaft from said counter-shaft at either one of two different speeds, said gear means being operable to drive said driven shaft from said driving shaft through the counter-shaft at any one of four speeds different from each other and from the speed of said driving shaft, the highest of said speeds of the driven shaft being greater than the speed of the driving shaft, whereby an effective change in gear ratio is obtained from the highest to the lowest speeds of the driven shaft greater than the reduction in gear ratio obtainable through the combination of the lower ratio gear means between the driven shaft and the counter-shaft and the low ratio gear means between the counter-shaft and the driven shaft.

3. A transmission for automotive vehicles including a casing having an open side, the remainder of said casing being substantially closed, webs projecting into said casing from the side walls opposite the open side and having bearing seats formed therein arranged in a plane spaced within and substantially parallel with the plane of said open side, driving, driven and counter-shafts journalled in said casing and said bearing seats, bearing caps secured to said bearing seats for retaining said shafts in position, and a shifter rod assembly secured to certain of said bearing caps.

4. A transmission for automotive vehicles including a casing having an open bottom and a closed top, webs depending from said top, aligned driving and driven shafts journalled in said casing, a counter-shaft journalled in said webs and arranged in substantially the same horizontal plane as said driving and driven shafts, a shifter rod assembly carried by said webs below said shafts, and an oil pan closing the open bottom of said casing.

5. A transmission for automotive vehicles including a casing having a top wall, side walls, end walls and an open bottom, aligned driving and driven shafts journalled in said end walls, webs depending from said top wall, a counter-shaft journalled in said webs and having one end spaced from one of said end walls, an operating arm extending downwardly between said end wall and the end of said counter-shaft, a shifter rod assembly carried by said webs below said shafts and associated with said arm and means closing the bottom of said casing.

HAROLD D. CHURCH.